US011507869B2

(12) United States Patent
Kotolyan

(10) Patent No.: US 11,507,869 B2
(45) Date of Patent: Nov. 22, 2022

(54) PREDICTIVE MODELING AND ANALYTICS FOR PROCESSING AND DISTRIBUTING DATA TRAFFIC

(71) Applicant: Digital Lion, LLC, Los Angeles, CA (US)

(72) Inventor: Aleksandr Kotolyan, North Hollywood, CA (US)

(73) Assignee: DIGITAL LION, LLC, Los Angeles, CA (US)

( * ) Notice: Subject to any disclaimer, the term of this patent is extended or adjusted under 35 U.S.C. 154(b) by 377 days.

(21) Appl. No.: 16/838,817

(22) Filed: Apr. 2, 2020

(65) Prior Publication Data

US 2020/0372386 A1 Nov. 26, 2020

Related U.S. Application Data

(60) Provisional application No. 62/852,916, filed on May 24, 2019.

(51) Int. Cl.

| | |
|---|---|
| ***G06N 7/00*** | (2006.01) |
| ***G06F 17/18*** | (2006.01) |
| ***G06N 20/20*** | (2019.01) |
| ***G06F 3/0482*** | (2013.01) |

(52) U.S. Cl.
CPC ........... *G06N 7/005* (2013.01); *G06F 3/0482* (2013.01); *G06F 17/18* (2013.01); *G06N 20/20* (2019.01)

(58) Field of Classification Search
None
See application file for complete search history.

(56) References Cited

U.S. PATENT DOCUMENTS

| | | | | |
|---|---|---|---|---|
| 9,043,219 | B2 | 5/2015 | Piersol | |
| 2017/0330099 | A1 | 11/2017 | De Vial | |
| 2018/0060723 | A1 | 3/2018 | Nakano et al. | |
| 2018/0268287 | A1 | 9/2018 | Johansen et al. | |
| 2019/0065606 | A1 | 2/2019 | Jiang et al. | |
| 2019/0384863 | A1* | 12/2019 | Sirin | G06K 9/6262 |
| 2020/0034665 | A1* | 1/2020 | Ghanta | G06N 20/00 |

FOREIGN PATENT DOCUMENTS

KR 10-2013-0073940 7/2013

OTHER PUBLICATIONS

International Search Report and Written Opinion for International Application No. PCT/US2020/034402, dated Aug. 28, 2020, 9 pages.

* cited by examiner

*Primary Examiner* — Duane N Taylor, Jr.
(74) *Attorney, Agent, or Firm* — Lewis Roca Rothgerber Christie LLP

(57) ABSTRACT

A system and method for generating and deploying a machine learning model for a real-time environment. User selected coefficients and training data are received via a graphical user interface. A first machine learning algorithm is invoked for generating a first machine learning model based on the received data. Accuracy of predictions by the first model are tested, and a determination is made that the accuracy of predictions of the first model is below a threshold value. In response to such a determination, a particular criterion is evaluated. In response to determining that the criterion is satisfied, a second machine learning algorithm is invoked for generating a second machine learning model based on the received data. The model is deployed instead of the first model for making real-time predictions based on incoming data.

20 Claims, 10 Drawing Sheets

| Σ | | | | | |
|---|---|---|---|---|---|
| 0.00000000 | | B1 | -0.00203557 | B2 | 0.00131133 | B3 | -2.51660257 |

| | | | |
|---|---|---|---|
| Σ 0.00000000 | B1 -0.00203557 | B2 0.00131133 | B3 -2.51660257 |
| Constant | Amount Request | Length at Address | Rent house |
| B6 0.11412782 | B7 0.11397685 | B8 0.00000000 | B9 0.22170498 |
| Contact time: Anytime | Contact time: Morning | Contact time: Afternoon | Contact time: Evening |
| B12 0.00000000 | B13 0.00000000 | B14 0.00000000 | B15 0.00000000 |
| Disability Income | Job Income | Military Income | Pension Income |
| B18 0.00000000 | B19 0.00000000 | B20 0.00000000 | B21 -0.01050436 |
| Benefits Income | Other Income | Pay frequency: Monthly | Pay frequency: Twice A Month |
| B24 0.00063908 | B25 -0.04125302 | B26 0.04094818 | B27 0.00175663 |
| Time employed | Next payday | Second payday | Months at bank |
| B30 0.00016185 | B31 0.00000000 | B32 0.00000000 | B33 0.00277333 |
| Monthlynet Income | Savings account | Checking account | Min Price |
| B36 -0.00520727 | B37 -0.02541420 | B38 0.00183767 | B39 -0.00270252 |
| Dub 7d sys | Dub 30d aff | Dub 30d sys | Dub 180 aff |
| B42 0.44905589 | B43 0.20321650 | B44 0.11686936 | B45 0.09147835 |
| Email .EDU | Email .GOV | Email .NET | Email .ORG |
| B48 0.00000000 | B49 0.00000000 | B50 0.00000000 | B51 0.00000000 |
| sinHR | cosHR | Sunday | Monday |

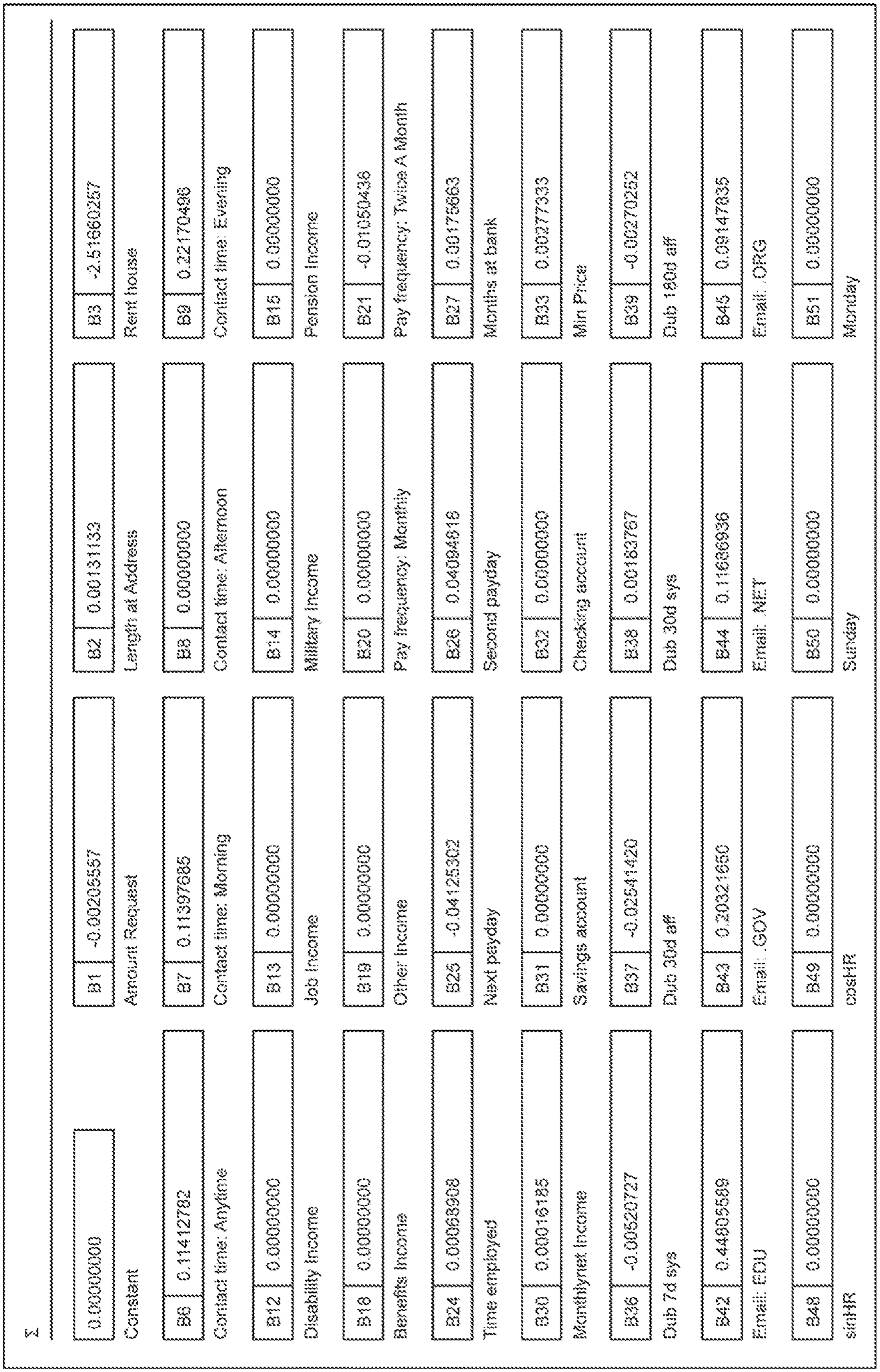

FIG. 3A 450 model DEVELOPER

FUNCTION

| Probit $$P = \frac{1}{\sqrt{2\pi}} \int_{-\infty}^{x} e^{-0.5 \cdot t^2} \, dt$$

SCORE

| 1 | 0.0114104500 | | 2 | 0.0183157500 |
| 3 | 0.0328327100 | | 4 | 0.0289834700 |
| 5 | 0.0386201900 | | 6 | 0.0573552200 |
| 7 | 0.0765307300 | | 8 | 0.1032280600 |
| 9 | 0.1746860200 | | 10 | 1.0000000000 |

FUNCTION accept probit model AiC built on 12/17 using 1101-1130 data

UPLOAD THE MODEL

CSV-file for updating coefficients

No file selected              Choose File

MIN PRICE & PERSONAL INFORMATION

Min Price (from - to)  Military status  FirstName or LastName or FirstName + LastName+ EmployerName
[ ] - [ ]  [ no ▾ ]  ◯ None  ⦿ DNP  ◯ Must Match ⑦ Block Domains and Zones  ⑦ Exclude e-mail containing substrings  ⑦ Block phone number starts  ⑦ Block IP .gov  [ Enter here ]  [ Enter here ]  [ Enter here ]
.mil

AGE  LEAD SCORE

MIN   MAX  MIN   MAX   Score Type   One post BYPASS of
[ 18 ] [   ] Add  [ 3 ▾ ] [ 10 ▾ ] [ Buyer ▾ ]  [ 10 ]  posts Min   Max   Delete
[ 21 ] [ 🗑 ]

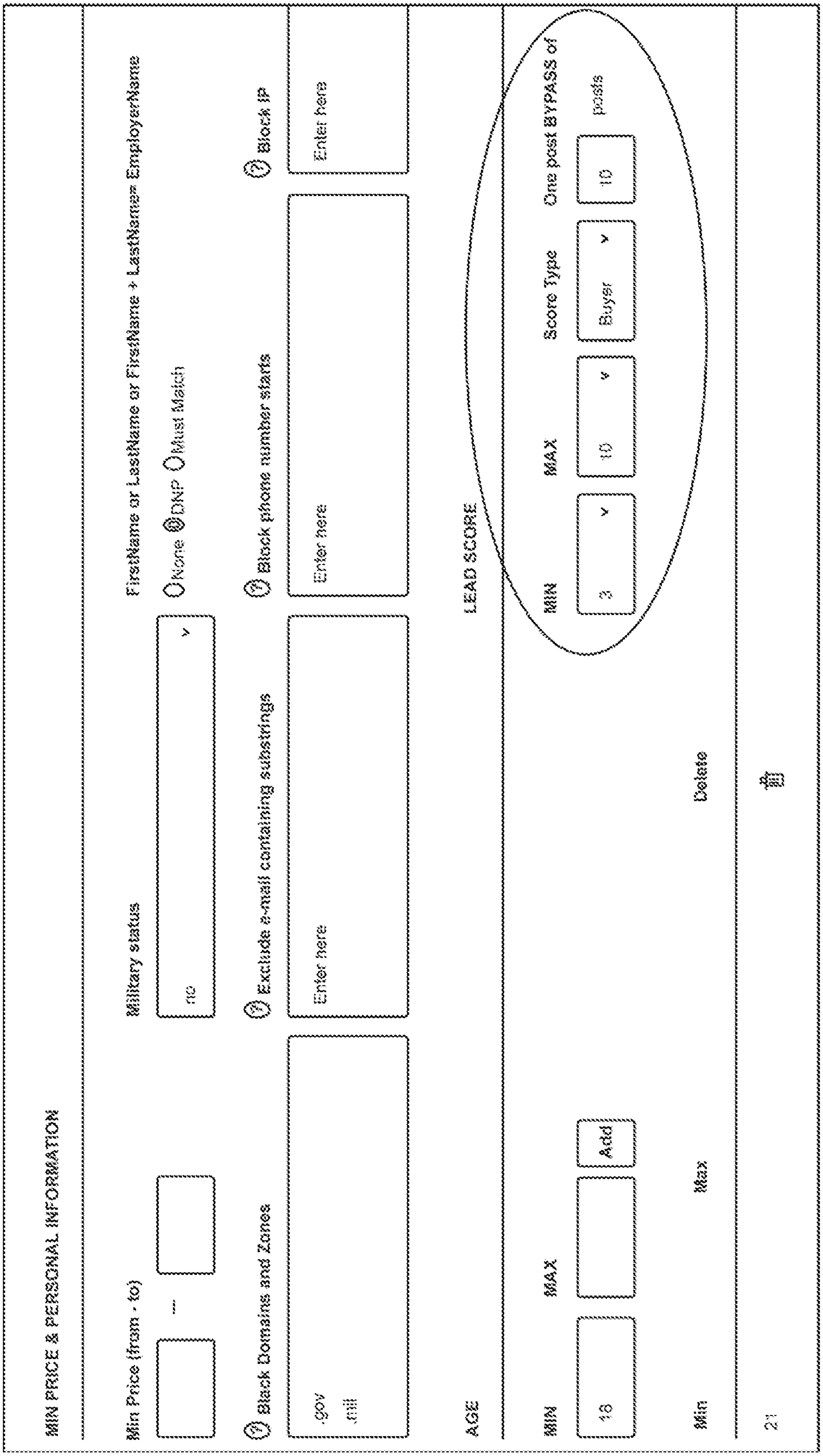

FIG. 6

Select Link

[ Logit ▾ ]

Select Independent Var

[ Status_Leads ▾ ]

Select other Var
- ☐ X
- ☐ X1
- ☐ id
- ☑ amount_request
- ☐ zip
- ☐ city
- ☐ state
- ☑ length_at_address
- ☐ email
- ☑ rent_or_own
- ☐ issuing_state
- ☐ phone
- ☑ contact_time
- ☑ dob
- ☐ armedforces
- ☐ incomesource
- ☐ employername
- ☑ timeemployed
- ☐ jobtitle
- ☑ paidevery
- ☑ nextpayday
- ☑ secondpayday
- ☐ accounttype
- ☐ bankname
- ☑ monthsbank
- ☐ directdeposit
- ☑ monthlynetincome
- ☐ createdate
- ☑ min_price

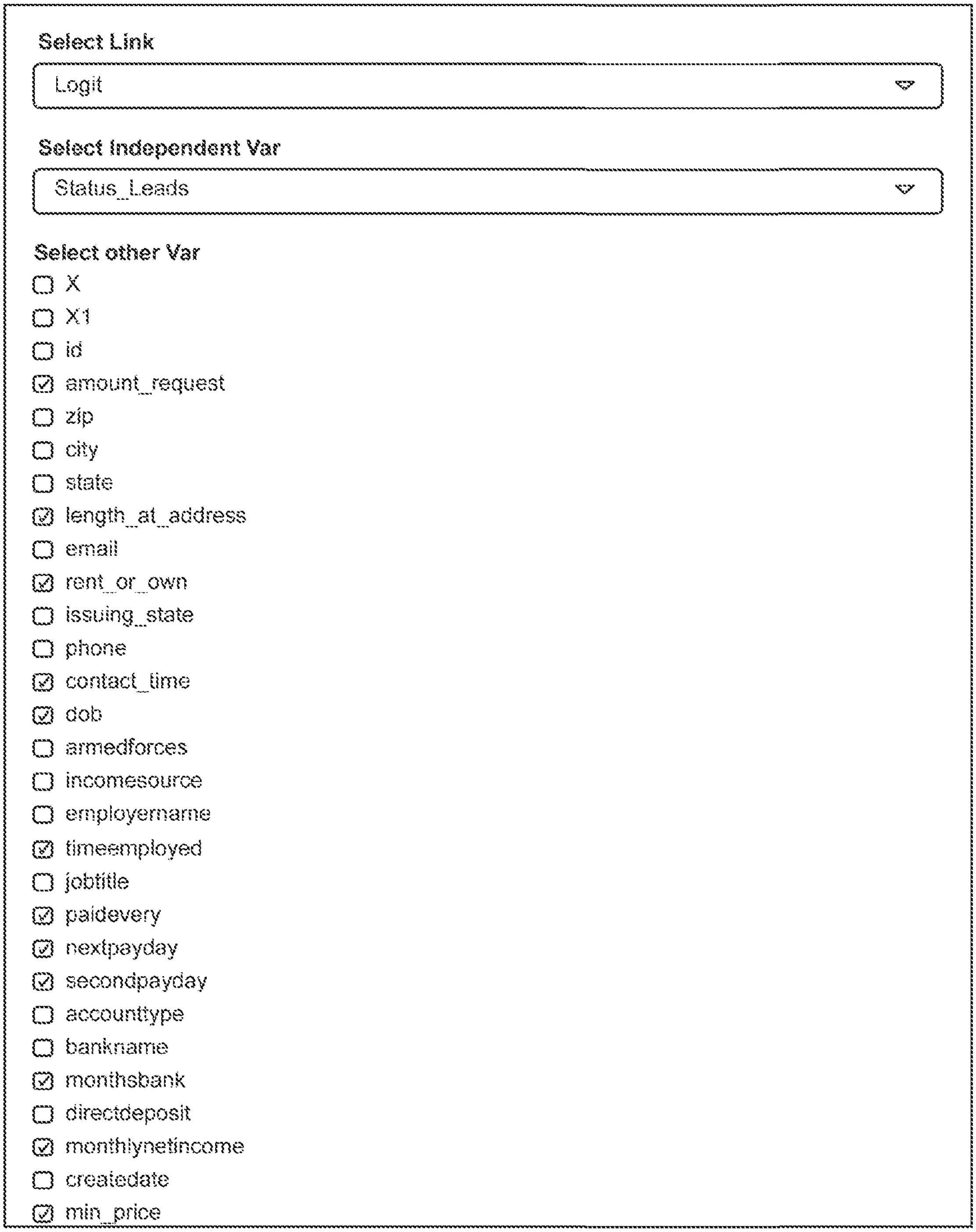

FIG. 7A

Your Selected variables

```
[1] "Status_Leads~amount_request+length_at_address++rent_or_own+contact_time+dob+timeemployed+paidevery+nextpayday+secondpayday+monthsbank+monthlynetIncome+min_price"

Call:
glm(formula = as.formula(form), family = binomial(link = "logit"),
    data = f)

Deviance Residuals:
    Min        1Q     Median       3Q       Max
-0.6023   -0.2093   -0.1631   -0.1354   3.2565

Coefficients:
                          Estimate  Std.  Error z  value   Pr(>|z|)
(Intercept)              -5.668e-01  2.466e+00  -0.230    0.8182
amount_request            9.347e-04  3.983e-04   2.347    0.0189
length_at_address        -7.076e-03  3.601e-03  -1.862    0.0625
rent_or_ownRent           8.786e-03  1.643e-01   0.053    0.9574
contact_timeAnytime      -4.089e-01  3.002e-01  -1.362    0.1732
contact_timeEvening      -4.502e-01  3.270e-01   1.377    0.1686
contact_timeMorning      -3.415e-01  3.532e-01  -0.967    0.3335
dob                      -8.869e-03  7.377e-03  -1.202    0.2293
timeemployed             -2.073e-03  3.197e-03  -0.648    0.5167
paideveryTwice A Month   -1.511e-01  2.682e-01  -0.564    0.5731
nextpayday                3.252e-01  1.723e-01   1.888    0.0591
secondpayday             -3.005e-01  1.713e-01  -1.754    0.0794
monthsbank                3.862e-03  2.095e-03   1.843    0.0653
monthlynetIncome          4.401e-05  4.435e-05   0.992    0.3210
min_price                 5.800e-02  1.013e-02   5.726  1.03e-08  ***
---
Signif.  codes:  0 '***'  0.001 '**'  0.01 '*'  0.05 '.'  0.1 ' '  1

(Dispersion parameter for binomial family taken to be 1)

    Null deviance:  1935.8 on 11252 degrees of freedom
Residual deviance.  1863.9 on 11238 degrees of freedom
  (6 observations deleted due to missingness)
AIC: 1893.9

Number of Fisher Scoring iterations: 7
```

PREDICTIVE MODELING AND ANALYTICS FOR PROCESSING AND DISTRIBUTING DATA TRAFFIC

CROSS-REFERENCE TO RELATED APPLICATION(S)

The present application claims priority to and the benefit of U.S. Provisional Application No. 62/852,916, filed May 24, 2019, entitled "PREDICTIVE MODELING AND ANALYTICS FOR PROCESSING AND DISTRIBUTING DATA TRAFFIC," the entire content of which is incorporated herein by reference.

FIELD

Aspects of the invention relate to the field of communication management, and more particularly, to processing and posting data traffic to destinations that are selected via predictive modeling and analytics.

BACKGROUND

The processing of data traffic, such as, for example, business leads, often entails identifying consumers that might be interested in certain products or services, and providing information about such consumers, to potential suppliers of the products or services (hereinafter "service providers" or "suppliers"). Information about consumers that have expressed interest in particular products or services may be referred to as a "lead."

A standard way to collect online leads is by having the consumers fill out forms on a website. The forms are used by the consumers to provide information about the customer and/or information about the product or service that the consumer desires. A lead distribution system may analyze the information provided by the consumers, and select one or more service providers to post the lead. For example, a consumer who is looking for a loan may fill out a loan-request form from a loan application website. The information provided in the loan-request form may then be sent to one or more banks or other financial institutions, as leads to those institutions.

Thus, what is desired is system and method for computing a likelihood of success for leads in a real-time environment where, based on such computing, lead traffic is directed to service providers that are predicted to produce optimal results.

The above information disclosed in this Background section is only for enhancement of understanding of the background of the invention, and therefore it may contain information that does not form the prior art that is already known to a person of ordinary skill in the art.

SUMMARY

Embodiments of the present disclosure are directed to a method for generating and deploying a machine learning model for a real-time environment. A processor receives, via a graphical user interface, user selected coefficients and training data, and invokes a first machine learning algorithm for generating a first machine learning model based on the received coefficients and training data. The processor tests accuracy of predictions by the first machine learning model, and determines that the accuracy of predictions of the first machine learning model is below a threshold value. In response to determining that the accuracy of predictions is below the threshold value, the processor evaluates a particular criterion. In response to the particular criterion being satisfied, a second machine learning algorithm is invoked for generating a second machine learning model based on the received coefficients and training data. The second machine learning model is deployed instead of the first machine learning model for making real-time predictions based on incoming data. In one embodiment, the incoming data is received from a plurality of sources, and the second machine learning model is invoked for predicting a likelihood of success associated with the incoming data from a particular source of the plurality of sources. The incoming data from the particular source is transmitted to a destination in response to determining the likelihood of success.

According to one embodiment, the destination is selected from a plurality of destinations, and the method further includes calculating values for the plurality of destinations; dynamically ranking the plurality of destinations based on the calculated values; and selecting the destination based on the ranking.

According to one embodiment, each of the values is calculated based on predicting a likelihood of success resulting from the incoming data from the particular source being transmitted to each of the plurality of destinations.

According to one embodiment, a signal is received from the destination in response to transmitting the incoming data. In response to receiving the signal, a second destination of the plurality of destinations is identified based on the ranking, and the incoming data is transmitted to the second destination.

According to one embodiment, the first machine learning model is a generalized linear model (GLM) associated with a first link function.

According to one embodiment, the second machine learning model is at least one of a principal component regression or a Bayesian GLM.

According to one embodiment, the criterion is size of the training data, wherein the criterion is satisfied in response to determining that the size of the training data is below a threshold size.

According to one embodiment, the likelihood of success includes a likelihood of selling the incoming data to the destination.

According to one embodiment, the second machine learning model is invoked for predicting a likelihood of success associated with the incoming data from a second source of the plurality of sources. A determination is made that the likelihood of success is below a threshold amount. The incoming data from the second source is filtered out in response to determining that the likelihood of success is below the threshold amount.

According to one embodiment, the incoming data from the second source is refrained from being transmitted to the destination in response to the filtering out.

Embodiments of the present disclosure are also directed to a system for generating and deploying a machine learning model for a real-time environment. The system comprises a processor and a memory, where the memory stores instructions that, when executed by the processor, cause the processor to: receive, via a graphical user interface, user selected coefficients and training data; invoke a first machine learning algorithm for generating a first machine learning model based on the received coefficients and training data; test accuracy of predictions by the first machine learning model; determine that the accuracy of predictions of the first machine learning model is below a threshold value; in response to determining that the accuracy of predictions is below the threshold value, evaluate a particular criterion; in response to the particular criterion being satisfied, invoke a second machine learning algorithm for generating a second machine learning model based on the received coefficients and training data; deploy the second machine learning model instead of the first machine learning model for making real-time predictions based on incoming data; receive the incoming data from a plurality of sources; invoke the second machine learning model for predicting a likelihood of success associated with the incoming data from a particular source of the plurality of sources; and transmit the incoming data from the particular source to a destination in response to determining the likelihood of success.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

FIG. 3A is a conceptual layout diagram of exemplary response variables according to an exemplary embodiment;

FIG. 6 is an example graphical user interface which allows an administrator to select minimum and maximum scores of leads that will be posted according to one exemplary embodiment;

FIGS. 7A-7B are examples of a graphical user interface provided by a model building application according to one exemplary embodiment.

DETAILED DESCRIPTION

Figure 1:
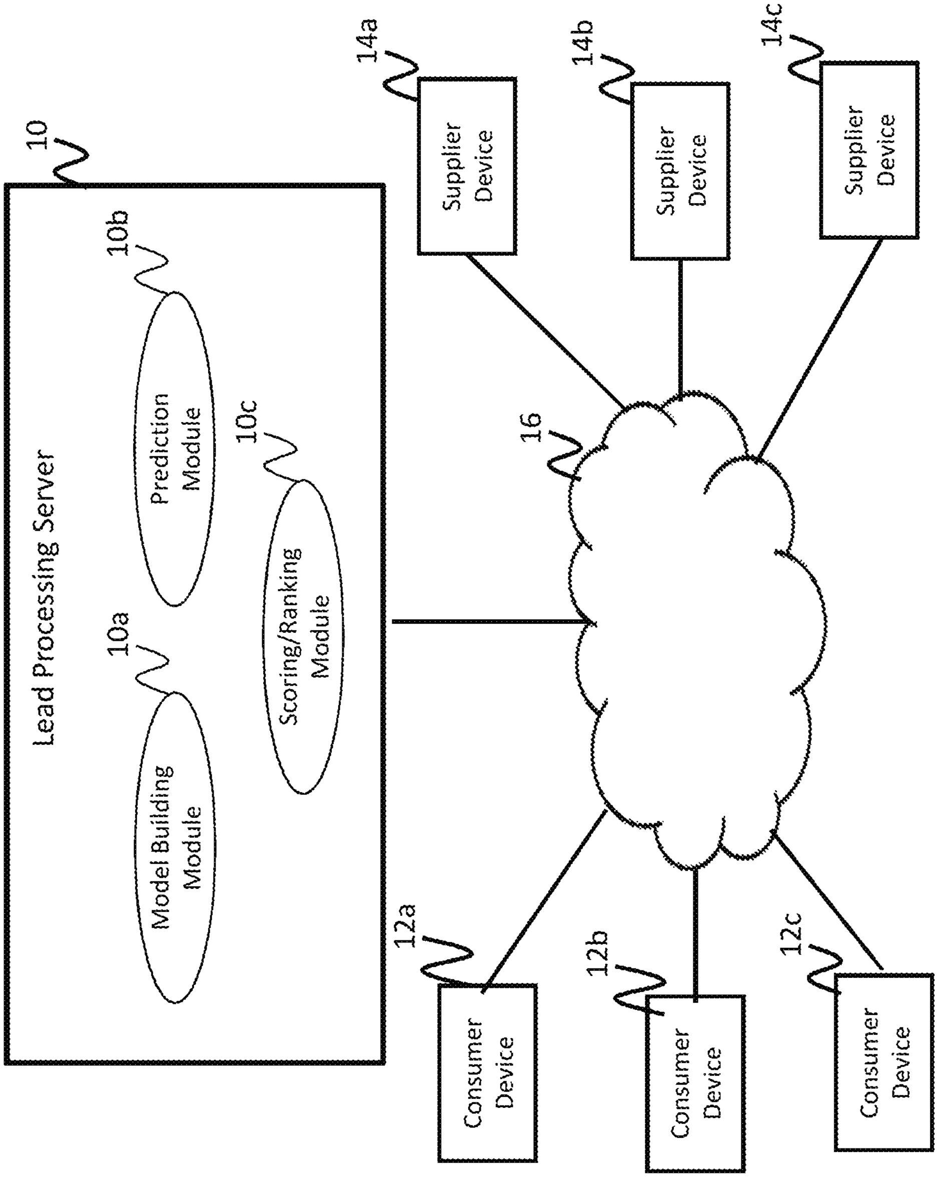
FIG. 1 is a system for processing and distributing lead traffic according to an exemplary embodiment.

In the following detailed description, only certain exemplary embodiments of the invention are shown and described, by way of illustration. As those skilled in the art would recognize, the invention may be embodied in many different forms and should not be construed as being limited to the embodiments set forth herein. Descriptions of features or aspects within each exemplary embodiment should typically be considered as available for other similar features or aspects in other exemplary embodiments. Like reference numerals designate like elements throughout the specification.

A lead processing system may identify hundreds if not thousands of leads to be posted (transmitted) to service providers at a given time. Upon posting, a lead processing system typically receives payment for each lead that is accepted by a service provider (i.e. sold or converted to the service provider). It is desirable to select and post leads to entities that are predicted to produce optimal results. Optimal results may be, for example, sale of leads that maximizes profit for the lead processing system.

The posting of leads with optimal results may not only benefit the lead processing system, but also the end users and service providers. In regards to the end users, the sooner that the lead for an end user is accepted by a service provider, the less computing resources need to be expended by the end user as the user is waiting to find a match to a service provider willing to accept and process the lead.

In regards to the service providers, such providers often need to process each of the leads that are posted to them, even if the leads are not accepted. Service providers may have their own algorithms for accepting leads or not. Processing leads are generally costly, not only in terms of finance, but also in terms of computing resources that need to be devoted to processing the leads. For example, a financial institution processing a lead relating to a loan may need to incur fees, and may further need to employ computing power and telecommunication resources to make background checks (e.g. credit checks) for an end user requesting the loan.

In general terms, embodiments of the present invention are directed to utilizing predictive modeling for computing a likelihood of success of target parameters (e.g. conversion, sale, default, etc.) in real-time. A decision may be made in real time as to where the lead is to be posted (if at all), based on the probability of success. In one embodiment, leads are posted to service suppliers that provide the highest probability of sale and expected profit.

Embodiments of the invention address a deficiency in the prior art to deliver predictive analytics in a real-time environment. Unlike delivering reports based on analysis of offline data where there is freedom of time to apply various modeling approaches, in a real-time environment, there is typically a fraction of a second to make decisions. In one embodiment, this problem is addressed by using a Generalized Linear Model (GLM) as a machine learning model for providing predictions on the target variables. In general terms, GLMs enable the use of linear models in cases where the response variable has an error distribution that is non-normal. A GLM generalizes linear regression by allowing the linear model to be related to the response variable via a "link function," and by allowing the magnitude of the variance of each measurement to be a function of its predicted value.

Another deficiency is associated with low predictive power of machine learning models trained on small data sets. Traditional machine learning approaches may sometimes have difficulties achieving sufficient predictive power when training data is small. In one embodiment, this problem is addressed by employing a Bayesian methodology that incorporates prior assumptions in order to compute posterior samples.

FIG. 1 is a system for processing and distributing lead traffic according to an exemplary embodiment. The system includes a lead processing server 10 coupled to various consumers via consumer devices 12*a*-12*c* (collectively 12), and various suppliers via supplier devices 14_a_-14_c_ (collectively 14), over a data communications network 16. The data communications network may be any private or public wide area network conventional in the art, such as for example, the Internet.

The lead processing server 10 includes one or more software modules for providing various services to the participating consumers and suppliers. Such software modules may include a model building module 10_a_, a prediction module 10_b_, and a scoring/ranking module 10_c_. Although the one or more modules 10_a_-10_c_ are assumed to be separate functional units, a person of skill in the art will recognize that the functionality of the modules may be combined or integrated into a single module, or further subdivided into further sub-modules without departing from the spirit and scope of the inventive concept.

According to one embodiment, the consumer and/or supplier devices 12, 14 may connect to the data communications network 16 using a telephone connection, satellite connection, cable connection, radio frequency communication, or any wired or wireless data communication mechanism known in the art. To this end, the devices 12, 14 may take the form of a personal computer (PC), laptop, smart phone, or any consumer electronics device known in the art.

According to one embodiment, the model building module 10_a_ is configured to build regression models for different target parameters. In one embodiment, the model building module 10_a_ uses traditional Generalized Linear Models (GLM) or its Bayesian version to build the regression models. An example target parameter may be a "sale" parameter which is used to predict the likelihood of a lead being accepted and sold to a particular service provider. Of course, other target parameters may also be predicted, such as for example, conversion, default, and/or the like. In one embodiment, the model building module 10_a_ is configured to employ both Frequentist and Bayesian methodologies for interpreting the probability of the target parameters.

According to one embodiment, the prediction module 10_b_ is configured to invoke one or more of the built models to make a prediction based on lead data received from the consumer devices 12. In this regard, the prediction module 10_b_ receives the lead data, extracts features to be input into the model, and performs a prediction based on the extracted features. The extracted features may correspond to the response variables of the model. The prediction that is output by the model may be a likelihood of success relating to a particular target parameter (e.g. sale to the service supplier). In one embodiment, the prediction is provided to the scoring/ranking module 10_c_ for posting the leads to the appropriate suppliers.

In one embodiment, the scoring/ranking module 10_c_ receives the predictions from the prediction module 10_b_ and filters the leads before posting the leads to the supplier devices 14. The filtering may be done based on scores assigned to the leads. In one embodiment, the scores are assigned by cutting the probabilities into intervals (e.g. 10 intervals) based on quantiles. Each interval is assigned a score. In one embodiment, the scoring/ranking module 10_c_ filters out leads associated with a particular score (e.g. score of 1 reflecting bottom 30% in the probability distribution). The leads that are filtered out may not be posted to any supplier device.

In one embodiment, the scoring/ranking module 10_c_ is configured to dynamically determine rankings of the channels of the various service providers to whom the non-filtered leads are to be posted. The dynamic ranking of channels may be referred to as a dynamic ping tree. Unlike traditional systems where the ranking of supplier channels is static, embodiments of the present invention calculate the rankings in real-time, to select a channel for a particular lead that is predicted to produce optimal results. An optimal result might be optimal profit that is expected to be derived by sending a particular lead to a particular supplier channel.

Figure 2:
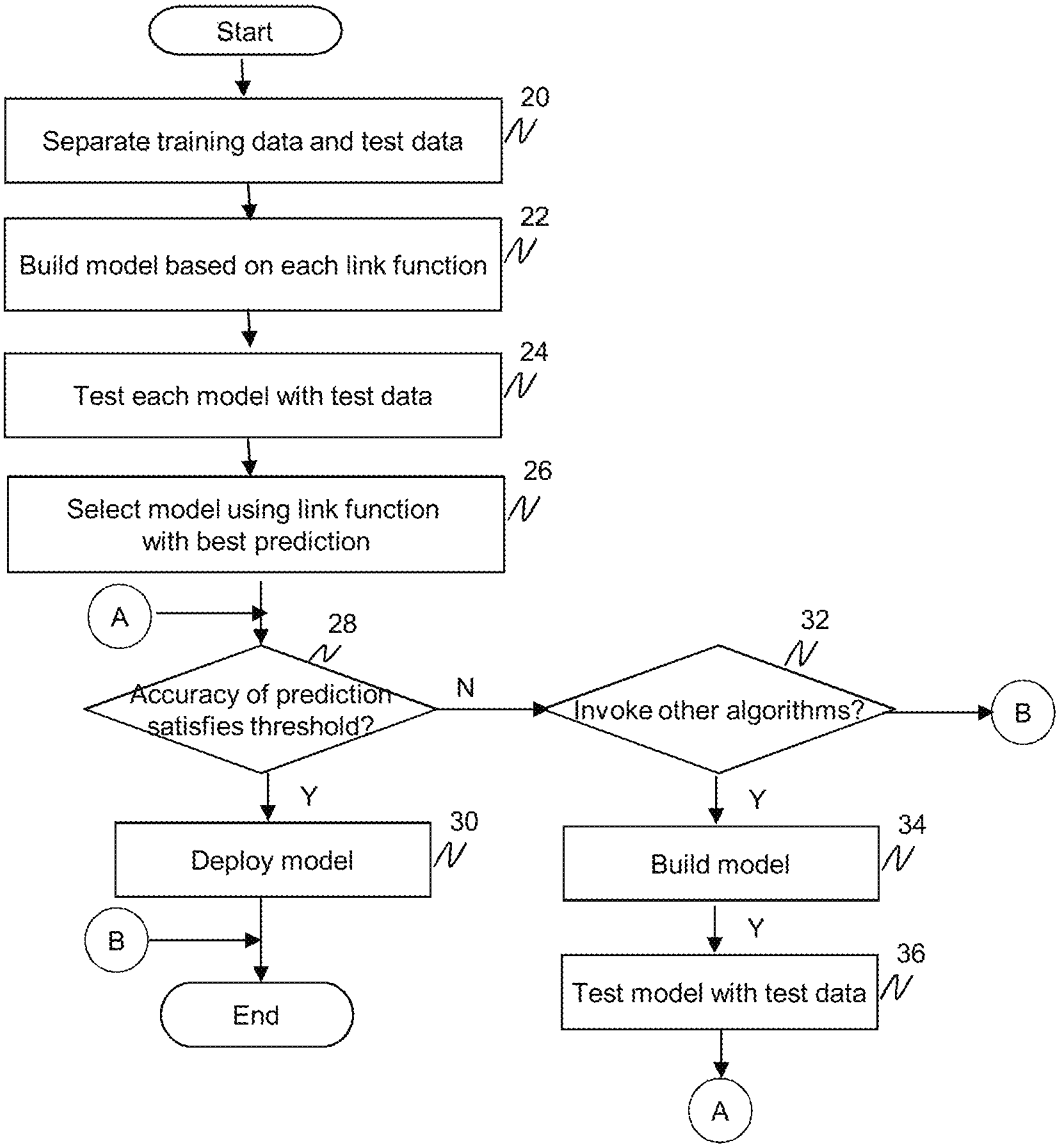
FIG. 2 a flow diagram of a process employed by a model building module for building a model to make real-time predictions on leads according to one exemplary embodiment.

FIG. 2 a flow diagram of a process employed by the model building module 10_a_ for building a model to make real-time predictions on leads according to one exemplary embodiment. It should be understood that the sequence of steps of the process is not fixed, but can be altered into any desired sequence as recognized by a person of skill in the art.

In act 20, the module 10_a_ identifies the data to be used for building the model, and separates the data into training data from the test data. In one embodiment, 80% of the data is used for training, and 20% of the data is used for testing, although other proportions are also possible.

The model may be created using a traditional GLM with a selected link function. In this regard, in act 22, the model building module 10_a_ builds a different model for each of various link functions. The link functions may be, for example, Logit link, Probit link, and Cauchit link, and/or Cloglog link.

Figure 3B:
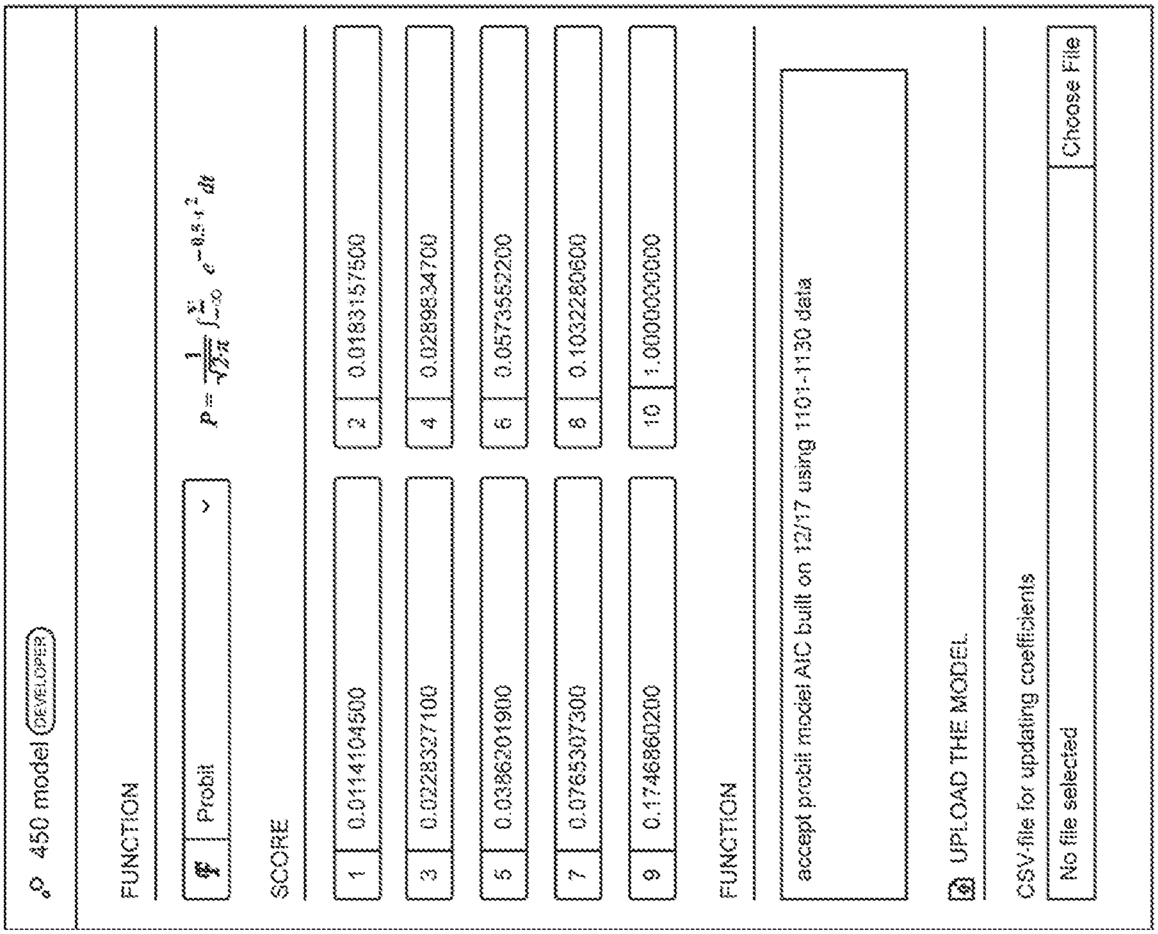
FIG. 3B is a graphical user interface for selecting a particular link function according to an exemplary embodiment.

The building of the model includes determining coefficient values of the response variables selected for the model. As shown in the example of FIG. 3A, the response variables that may be used to predict acceptance of a loan application lead by a lender may include the amount of the loan requested, length the requester has lived at his address, whether the requester rents or owns, and the like. The example of FIG. 3B contemplates the use of the Probit link function, where the probability of success is defined by:

$$p_i = \frac{1}{\sqrt{2\pi}} \int_{-\infty}^{X_i\beta} \exp\{-0.5 \cdot t^2\} dt$$

where $p_i$ is the probability of sale, and $X_i\beta$ is the sum of coefficient times variable.

In act 24, each of the models that is built is tested with the test data set aside in act 20.

Figure 4:
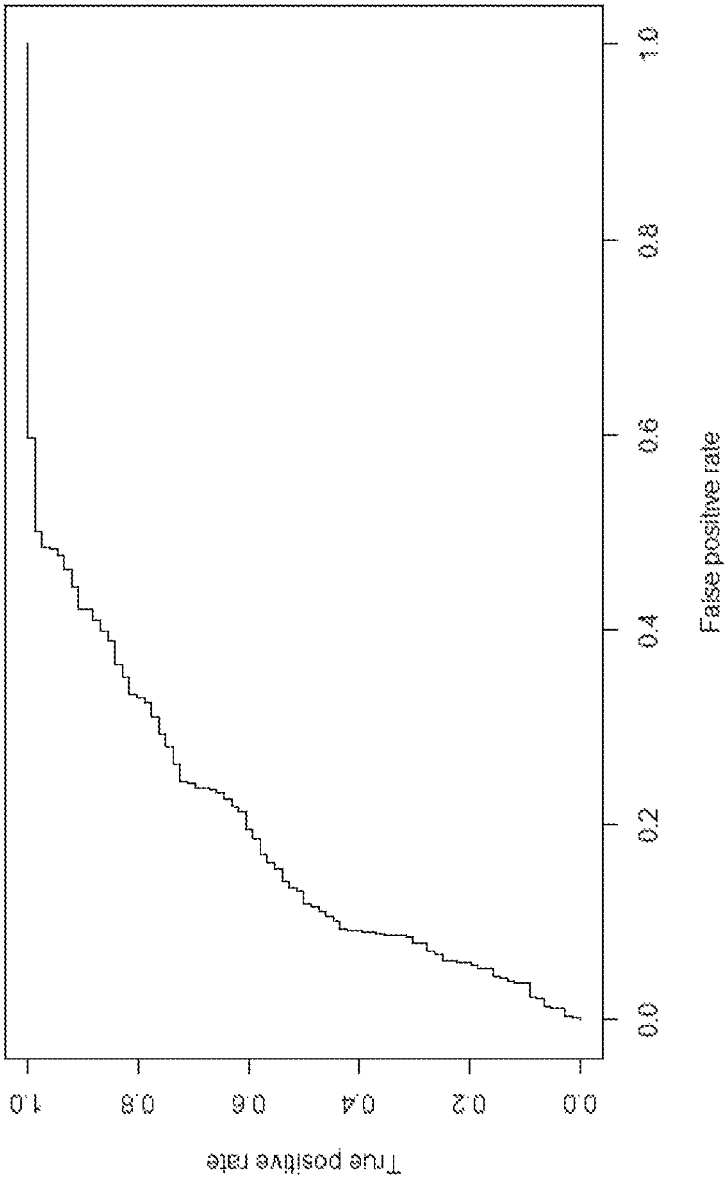
FIG. 4 is a receive operation characteristic (ROC) graph using the statistical language R according to one exemplary embodiment.

In act 26, the model building module 10_a_ selects the model with a link function that results in the most accurate prediction. The determining of the accuracy of the prediction may entail, for example, checking a true positive rate against a false positive rate, and analyzing the distribution of scores. A receive operation characteristic (ROC) graph using the statistical language R (ROCR curve) may be generated or checking the accuracy. FIG. 4 is an example ROCR curve. For example, in minimizing sales within bottom 30% of probabilities, if bottom 30% of leads (i.e. leads with bottom 30% of probabilities of success) contain over 5% actual sales, the model is disregarded and not considered for production. In one embodiment, the actual sales rate is minimized in order to have minimal impact on sales or any other target parameter by removing 30%, 50%, etc. of traffic.

In act 28, a determination is made as to whether the highest accuracy that can be achieved based on the tested link functions satisfies a set threshold value. If the answer is YES, the selected model is deployed in act 30. In this regard, the model may be deployed in developer mode where a second state of testing is performed based on real-world data. In this regard, the model running in developer mode runs concurrently with another model that is in production mode, and both models output predictions based on the real-world data. In one embodiment, the accuracy of the predictions of the model running in production mode is compared against the model running in developer mode. if the model running in developer mode performs better than the model in production mode, the model running in developer mode is upgraded to be used in the production mode.

If the highest accuracy that can be achieved based on the tested link functions do not satisfy the set threshold value, a determination is made in act 32 as to whether other machine learning algorithms can be invoked instead of the traditional GLM methodology. In one embodiment, such other algorithms may be a principal component regression, Bayesian GLM, and/or the like.

In one embodiment, the Bayesian GLM is invoked as the other machine learning algorithm if certain criteria are satisfied. Such criteria may be, for example, size of the training data, importance of the service providers to whom leads are to be posted, and/or the like. In one embodiment, Bayesian GLM is invoked if the size of the training data is sufficiently small, such as, for example a data size of under 500 and a success rate of under 5%. When Bayesian GLM is used to build the model, prior parameters (e.g. mean age, mean income, standard deviation, etc.) may be used to get posterior MAP (maximum a posteriori) and posterior distributions.

In act 34, the selected other machine learning algorithm is invoked to build a model, and the model is tested with the test data in act 36. The process then returns in act 28 to determine the accuracy of the prediction.

In one embodiment, the selecting of the model that is to be deployed is performed automatically via a recommendation engine (not shown). In this regard, the recommendation engine may be configured to build a model based on each of the various link functions. The recommendation engine may also be configured to automatically test the predictive power of each of the link functions using the test data. The link function with the most accurate prediction may then be output as the recommended link function.

In some embodiments, the recommendation engine may be configured to employ other machine learning algorithms if the predictions made with the tested link functions fail to satisfy a threshold value. In this regard, the recommendation engine may be configured to determine whether certain criteria (e.g. test sample size) has been satisfied in order to invoke the other machine learning algorithms. If the criteria has been satisfied, the alternative algorithm is invoked to build and deploy the model that is to be used.

Once a model is deployed, the model may then be used to make predictions on the likelihood of success (e.g., likelihood of sale) for the incoming leads, and post leads with the highest likelihood of success to one or more supplier devices. In one embodiment, the scoring/ranking module 10*c* receives the predictions from the prediction module 10*b* and scales the received probabilities into scores within a particular range, such as, for example, a range of 1-10. In one example, a lead with the lowest probability is assigned to a score of 1, and a lead with the highest probability is assigned to a score of 10. The scaling may be done through, for example, quantiles, where a bottom 30% of the probabilities are assigned the score of 1, followed by the cutoffs listed in Table 1.

TABLE 1

| Score | Probability of sale/conversion |
|---|---|
| 1 | 0-0.3 |
| 2 | 0.3-0.5 |
| 3 | 0.5-0.6 |
| 4 | 0.6-0.7 |
| 5 | 0.7-0.8 |
| 6 | 0.8-0.9 |
| 7 | 0.9-0.95 |
| 8 | 0.95-0.98 |
| 9 | 0.98-0.995 |
| 10 | 0.995-1 |

In one embodiment, the scoring/ranking module 10*c* controls the traffic quality by posting a specific range of scores to the suppliers. In the above example, if the scoring/ranking module 10*c* is configured to filter out scores 1-3 and only post traffic with scores 4-10, 60% of the traffic associated with low probabilities are filtered out.

Figure 5:
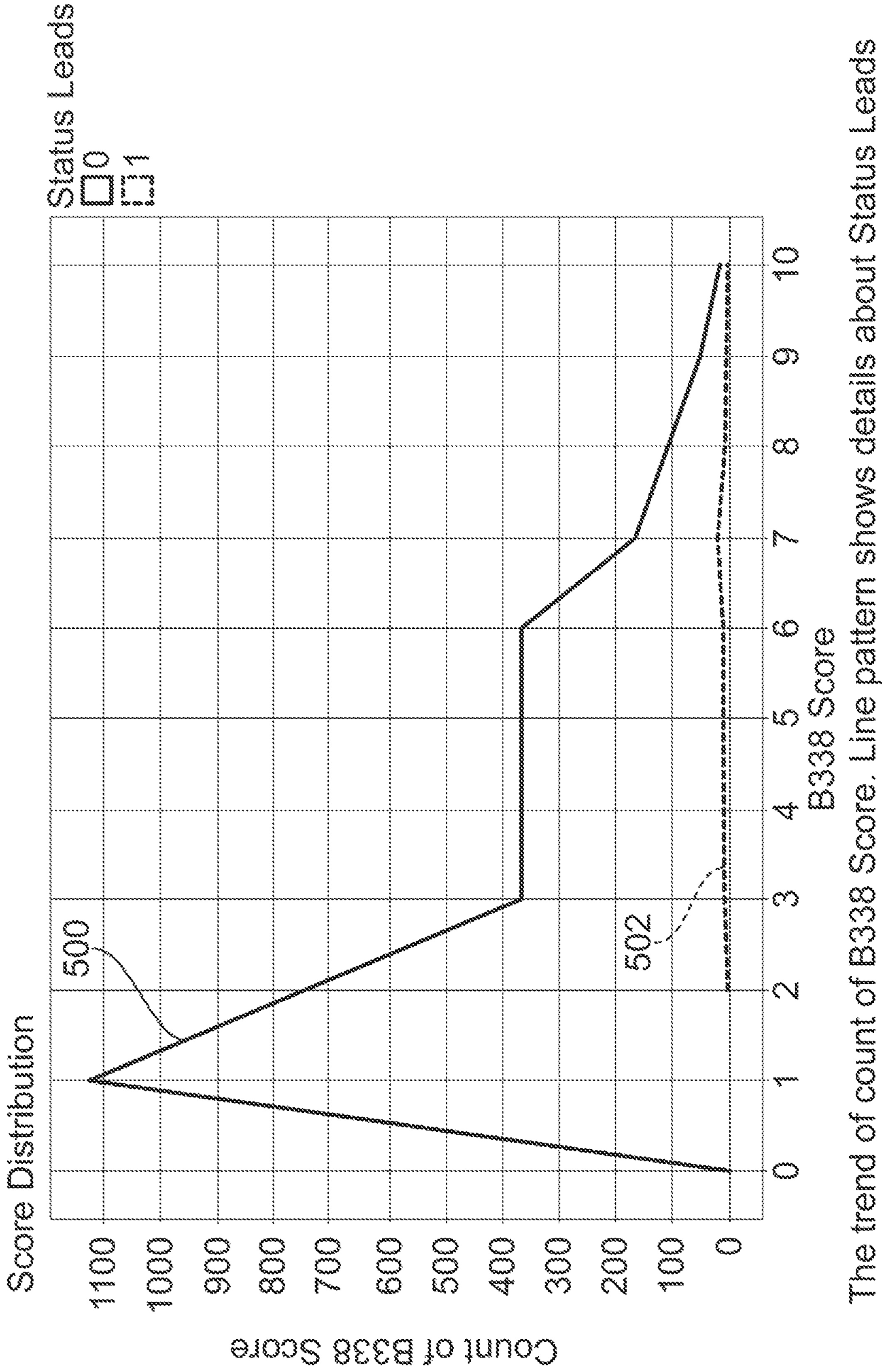
FIG. 5 is an example score distribution graph according to one exemplary embodiment.

FIG. 5 is an example score distribution graph based on experiments run where a total number of buyers is 338, the total posted leads is 3748, total sold is 76, and accept rate is 2.02%. Line 500 depicts leads that were not sold. Experiments show that by removing leads with a score of 1, 1124 leads are removed, leaving the total new posted leads to be 2624 (about 30% of the traffic), without loss of any sales. Line 502 depicts leads that were sold. The total sold still remains 76, but the accept rate increases to 2.9%. When leads of score 1 and 2 are removed, 50% less traffic would be posted, and the accept rate would increase to 74/1872=3.95%.

FIG. 6 is an example graphical user interface which allows an administrator to select the minimum and maximum scores of leads that will be posted according to one embodiment. Leads with scores outside of this range may be filtered out.

An example lead may have the following extracted features corresponding to the response variables:

Requesting: $500
State: TX
Length at address: 36 months
Email: ends with .com
Owns a property
Contact time: morning
Age: 48
Monthly income: $2500
Paid: every 2 weeks
Has direct deposit
Min price $2
We've seen this person 11 times within 7 days
Applied at 8 AM
Circular variable sin HR 0.866025
Circular variable cos HR −0.5

Applying the Probit link function to the above lead data outputs the following:

$$X_i\beta = -29.91 - 0.0002623 * \$500 + 0.2681 * 1 + 0.1631 * 1 - 0.00004517 * \$2500 + 0.05517 * \$2 - 0.1373 * 1 - 0.002931 * 11 + 2.974 * 8 + 9.076 * 0.866025 + 7.646 * (-0.5) + 0.1815 * 1 + 0.4384 * 1 = -1.333133$$

$$p_i = \frac{1}{\sqrt{2\pi}} \int_{-\infty}^{X_i\beta} \exp\{-0.5 \cdot t^2\} dt = 0.0912$$

Integrate exp(−0.5*x^2) from −infinity to −1.333133 to output a probability of 0.0912.

Since the probability of 0.0912 is greater than the cutoff 0.08369, the lead is assigned a score of 9.

In one embodiment, the functionalities of the prediction module 10*b* is provided via a model building application which may be installed/downloaded onto the supplier device 14 (or any other third party device), for building and training models locally. The application may be coded through statistical software R and Shiny.

In one embodiment, the prediction module 10*b* provides a graphical user interface that allows people without advanced statistical and programming skills to build and apply models in a real time environment. In this regard, a user uploads the data to be used for training/testing, selects the explanatory and response variables, and the background R code produces a model.

FIGS. 7A-7B are examples of a graphical user interface provided by the model building application according to one exemplary embodiment. In one embodiment, the graphical user interface allows the user select the link function (e.g. Logit link function) to use to build the model. The user may then select an independent/explanatory variable (e.g. lead status), and one or more response variables. In response to a selection to build the model based on the selected variables, the prediction module 10*b* may proceed to build the model based on uploaded training data. The coefficient values 600 of the selected features may then be output via the graphical user interface. The significance of the coefficients 602 are also output by the graphical user interface. The significance information allows the user to remove coefficients with a significance lower than a set threshold. Thus, via the graphical user interface, a user may play around with the various coefficients/variables to determine the kind of model that is to be built.

In one embodiment, the user may select different link functions to use to build a model. The prediction accuracy of the models built using the various link functions may then be tested. In one embodiment, the available link functions may be used to automatically build and test the models using the uploaded test data, and a model having the highest accuracy may be recommended.

Figure 8:
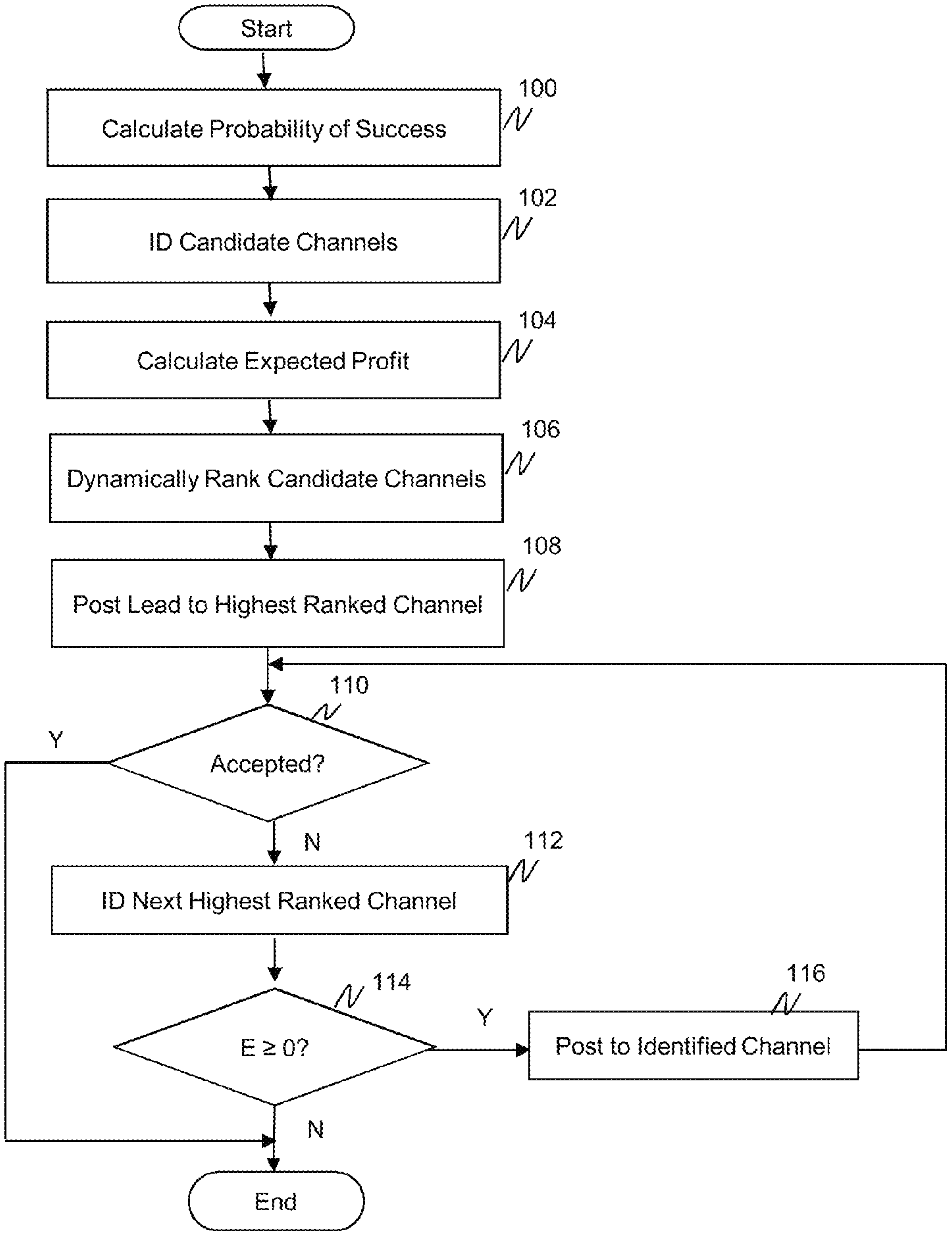
FIG. 8 is a flow diagram of a process employed by a scoring/ranking module for posting leads to suppliers based on real-time predictions made for incoming leads according to an exemplary embodiment.

FIG. 8 is a flow diagram of a process employed by the scoring/ranking module 10*c* for posting leads to suppliers based on real-time predictions made for incoming leads according to an exemplary embodiment. The described flow is for processing a single lead, but as a person of skill in the art should understand, the same processing is concurrently performed by the server on hundreds if not thousands of other leads at a particular point in time.

In act 100, the scoring/ranking module 10*c* invokes the prediction module 10*b* to calculate the likelihood of success in regards to a lead.

In act 102, the scoring/ranking module 10*c* identifies candidate channels to which the lead may be posted. A particular supplier may have multiple channels to which leads may be posted, and each channel may be defined, for example, based on the type of services available via the channel. The channels may be referred to as a "ping tree." For example, if a supplier is a lender, the lender may have channel A for mortgage loans, channel B for business loans, channel C for car loans, and the like. The applicable channels are identified by comparing information about the lead, and information on the various channels for the various lenders.

In act 104, the scoring/ranking module 10*c* proceeds to calculate an expected profit for each of the candidate channels in real time. The formula for the expected profit (E) for a lead (A) may be as follows:

$$E(A)=P(\text{Sale}A)*\text{Money Made}+(1-P(\text{Sale}A))*(-\text{Money Spent})$$

In another embodiment, the expected profit may be computed as follows:

$$E(A)=(\text{Money Made}-\text{Money Spent})*P(\text{Sale}A)$$

In the above example, the probability of success that is computed by the prediction module 10*b* is the probability of sale of Lead A to a supplier.

In act 106, the candidate channels are ranked dynamically according to the calculated expected profit.

In act 108, the lead is posted to the channel with the highest expected profit.

In act 110, a determination is made as to whether the lead is accepted by the posted channel. In this regard, the channel may transmit a first message or signal indicative of acceptance of the lead, or a second message of signal indicative of a rejection of the lead.

If the channel transmits the first message or signal indicative of acceptance of the lead, the process ends. However, if the channel transmits the second message or signal indicative of a rejection of the lead, the next highest ranked channel is identified in act 112.

If, as determined in act 114, the expected profit of the next highest ranked channel is greater than 0, the lead is posted to the identified channel in act 116. The process then returns to act 110 to determine whether the lead is accepted by the posted channel or not.

As a person of skill in the art should appreciate, the technical benefits of dynamically ranking and posting leads to the channels include, for example, shortening the waiting time of consumers before being redirected to a lender's landing page, for lenders increasing the redirect rate. Due to longer "falls" (i.e. moving down from one channel to a next channel) in a static ping tree, consumers are more likely to close the web browser and end the session which will lead to no redirect. In one embodiment, with a dynamic ping tree, the fall is short, which leads to higher redirect rates.

The various servers described herein may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

As will be appreciated by a person of skill in the art, the system and method according to the various embodiments provide technical improvements to the processing and distribution of lead traffic. For example, instead of wasting computing resources, telecommunications bandwidth, and the like, to post a lead to a service provider that will not accept the lead, machine learning is employed to predict and select service providers that will result in success. Technical improvements are also provided due to the creating of computer models that are deemed best given the current context. The more accurate the computer model, the more accurate the predictions of success.

Each of the various servers, controllers, engines, and/or modules (collectively referred to as servers) in the afore-described figures may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g., an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of", when preceding a list of elements, modify the entire list of elements and do not modify the individual elements of the list. Further, the use of "may" when describing embodiments of the inventive concept refers to "one or more embodiments of the inventive concept". Also, the term "exemplary" is intended to refer to an example or illustration.

As used herein, the terms "use", "using", and "used" may be considered synonymous with the terms "utilize", "utilizing", and "utilized", respectively.

While this invention has been described in detail with particular references to illustrative embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims and equivalents thereof.

What is claimed is:

1. A method for generating and deploying a machine learning model for a real-time environment, the method comprising:

receiving, via a graphical user interface, user selected coefficients and training data;

invoking a first machine learning algorithm for generating a first machine learning model based on the received coefficients and training data;

testing accuracy of predictions by the first machine learning model;

determining that the accuracy of predictions of the first machine learning model is below a threshold value;

in response to determining that the accuracy of predictions is below the threshold value, evaluating a particular criterion;

in response to the particular criterion being satisfied, invoking a second machine learning algorithm for generating a second machine learning model based on the received coefficients and training data;

deploying the second machine learning model instead of the first machine learning model for making real-time predictions based on incoming data;

receiving the incoming data from a plurality of sources;

invoking the second machine learning model for predicting a likelihood of success associated with the incoming data from a particular source of the plurality of sources; and transmitting the incoming data from the particular source to a destination in response to determining the likelihood of success.

2. The method of claim 1, wherein the destination is selected from a plurality of destinations, the method further comprising:

calculating values for the plurality of destinations;

dynamically ranking the plurality of destinations based on the calculated values; and selecting the destination based on the ranking.

3. The method of claim 2, wherein each of the values is calculated based on predicting a likelihood of success resulting from the incoming data from the particular source being transmitted to each of the plurality of destinations.

4. The method of claim 2 further comprising:

receiving a signal from the destination in response to transmitting the incoming data;

in response to receiving the signal, identifying a second destination of the plurality of destinations based on the ranking; and transmitting the incoming data to the second destination.

5. The method of claim 1, wherein the first machine learning model is a generalized linear model (GLM) associated with a first link function.

6. The method of claim 5, wherein the second machine learning model is at least one of a principal component regression or a Bayesian GLM.

7. The method of claim 6, wherein the criterion is size of the training data, wherein the criterion is satisfied in response to determining that the size of the training data is below a threshold size.

8. The method of claim 1, wherein the likelihood of success includes a likelihood of selling the incoming data to the destination.

9. The method of claim 1 further comprising:

invoking the second machine learning model for predicting a likelihood of success associated with the incoming data from a second source of the plurality of sources;

determining that the likelihood of success is below a threshold amount; and filtering out the incoming data from the second source in response to determining that the likelihood of success is below the threshold amount.

10. The method of claim 9 further comprising refraining transmitting the incoming data from the second source to the destination in response to the filtering out.

11. A system for generating and deploying a machine learning model for a real-time environment, the system comprising:

processor; and memory, wherein the memory stores instructions that, when executed by the processor, cause the processor to:

receive, via a graphical user interface, user selected coefficients and training data;

invoke a first machine learning algorithm for generating a first machine learning model based on the received coefficients and training data;

test accuracy of predictions by the first machine learning model;

determine that the accuracy of predictions of the first machine learning model is below a threshold value;

in response to determining that the accuracy of predictions is below the threshold value, evaluate a particular criterion;

in response to the particular criterion being satisfied, invoke a second machine learning algorithm for generating a second machine learning model based on the received coefficients and training data;

deploy the second machine learning model instead of the first machine learning model for making real-time predictions based on incoming data;

receive the incoming data from a plurality of sources;

invoke the second machine learning model for predicting a likelihood of success associated with the incoming data from a particular source of the plurality of sources; and transmit the incoming data from the particular source to a destination in response to determining the likelihood of success.

12. The system of claim 1, wherein the destination is selected from a plurality of destinations, wherein the instructions further cause the processor to:

calculate values for the plurality of destinations;

dynamically rank the plurality of destinations based on the calculated values; and select the destination based on the ranking.

13. The system of claim 12, wherein each of the values is calculated based on predicting a likelihood of success resulting from the incoming data from the particular source being transmitted to each of the plurality of destinations.

14. The system of claim 12, wherein the instructions further cause the processor to:

receive a signal from the destination in response to transmitting the incoming data;

in response to receiving the signal, identify a second destination of the plurality of destinations based on the ranking; and transmit the incoming data to the second destination.

15. The system of claim 11, wherein the first machine learning model is a generalized linear model (GLM) associated with a first link function.

16. The system of claim 15, wherein the second machine learning model is at least one of a principal component regression or a Bayesian GLM.

17. The system of claim 16, wherein the criterion is size of the training data, wherein the criterion is satisfied in response to determining that the size of the training data is below a threshold size.

18. The system of claim 11, wherein the likelihood of success includes a likelihood of selling the incoming data to the destination.

19. The system of claim 11, wherein the instructions further cause the processor to:

invoke the second machine learning model for predicting a likelihood of success associated with the incoming data from a second source of the plurality of sources;

determine that the likelihood of success is below a threshold amount; and filter out the incoming data from the second source in response to determining that the likelihood of success is below the threshold amount.

20. The system of claim 19, wherein the instructions further cause the processor to refrain transmitting the incoming data from the second source to the destination in response to the filtering out.

* * * * *